Feb. 13, 1968

L. L. SZEGO ETAL 3,368,763

PROCESSING APPARATUS

Filed May 1, 1964

INVENTORS
LASZLO LAZARUS SZEGO
JOHN SZEGO

BY Hane and Nydick

ATTORNEYS

Feb. 13, 1968   L. L. SZEGO ETAL   3,368,763
PROCESSING APPARATUS

Filed May 1, 1964   7 Sheets-Sheet 3

INVENTORS
LASZLO LAZARUS SZEGO
JOHN SZEGO
BY Hane and Nydick
ATTORNEYS

Feb. 13, 1968  L. L. SZEGO ETAL  3,368,763
PROCESSING APPARATUS

Filed May 1, 1964  7 Sheets-Sheet 6

INVENTORS
LASZO LAZARUS SZEGO
JOHN SZEGO
BY
Hane and Nydick
ATTORNEYS

United States Patent Office 3,368,763
Patented Feb. 13, 1968

3,368,763
PROCESSING APPARATUS
Laszlo Lazarus Szego, South Woodford, London, and John Szego, London, England, assignors to John Robert Berend
Filed May 1, 1964, Ser. No. 364,191
20 Claims. (Cl. 241—155)

The present invention relates to apparatus for processing materials and has particular but not exclusive reference to such processes as comminuting and fragmenting solid materials, and forming homogeneous mixtures of solid materials or of solid materials with liquids or of liquids with liquids. The apparatus may be applied in such widely ranged fields as the grinding of coal and the homogenising of chocolate, for example.

The apparatus is of the general type in which the referred to processes are carried out by passing the materials between a processing surface, and balls which run over the surface to act as comminuting or homogenising elements.

Known apparatus of this type comprises two spaced concave surfaces which have a plurality of balls, disposed therebetween, and in contact therewith, one of the surfaces being driven and the other stationary, the relative movement of the surfaces causing the balls to translate over the stationary surface.

In this known type, each ball contacts both of its neighbours, and the result is that the trailing part of one ball and the leading part of the following ball are rotating in opposite directions whilst in contact: this leads to considerable wear of the balls which tend to become non-spherical.

This non-sphericity of the balls affects the concave surfaces, which as a result become worn and deformed so that the apparatus as a whole becomes progressively less efficient. The product suffers in being badly contaminated by the attrited portions of the apparatus and in being uneven in texture. The power consumption of the apparatus is high and replacing worn parts is expensive.

An object of the invention is to provide an improved apparatus and according to the invention there is provided apparatus for processing materials, comprising a processing surface, a plurality of processing elements, at least a part of the surface of each of which engages and is of a configuration to roll over said surface, a spacing member between each one of a pair of adjacent elements so that the elements are spaced apart by the members, there being provided a driving member which can cause the elements to move relative to, and to roll on, the processing surface.

In another aspect, the invention provides apparatus for processing materials, comprising a processing surface, a plurality of processing elements, at least a part of the surface of each of which engages and is of a configuration to roll over said surface, a rotatable spacing member between each one of a pair of adjacent elements so that the elements are spaced apart by the members which bear thereagainst, there being provided a driving member which can cause the elements to move relative to, and to roll on, the processing surface, and during such movement the elements contra-rotating relative to the spacing members with which they engage.

The invention also provides apparatus for processing materials comprising a processing surface, a plurality of processing elements at least a part of the surface of each of which engages and is of a configuration to roll over said surface, a rotatable spacing member between each element of a pair of adjacent elements so that the elements are spaced apart by the members which bear thereagainst, a second surface bearing on the elements and the spacing members, means being provided to urge the second surface and the processing surface in such direction as to cause the elements to press against the processing surface, a driving member which can cause the elements to move relative to, and to roll on, the processing surface, during such movement the elements contra-rotating relative to the spacing members with which they engage.

In yet another aspect, the invention provides apparatus for processing materials comprising an annular concave processing surface and an annular second surface coaxial therewith, between which lie a plurality of spherical processing elements each of which will roll over said surface and is of a radius less than that of the concavity of the surfaces, a rotatable spacing member between each element of a pair of adjacent elements so that the elements are spaced apart by the members which bear thereagainst, the centres of the elements and members lying on a cone, the apex of which lies on the axis of the annular surfaces, means being provided to urge the second surface and the processing surface toward each other to cause the elements to press against the processing surface, there being also provided a driving member which can cause the elements to move relative to, and to roll on, the processing surface, during such movement the elements contra-rotating relative to the spacing members with which they engage, and a self-centering supporting surface for locating the members.

The rotatable processing elements and the spacing members may be balls or rollers, for example, and the processing surface suitably may be concave to guide the rotatable elements. Driving means are provided for causing the elements to translate over the processing surface. The driving means can act to translate the spacing members relative to the processing surface causing them to engage and thus drive the elements, or the driving means can act to drive a surface in contact with the elements or the spacing members. The elements and the processing surface may be urged toward each other by any pressure applying means which may comprise a surface engaged by the elements or the spacing members or other suitable means loading the elements or the spacing members.

In practical embodiments of the invention, the processing surface would take the form of a circular or annular race, concave in cross-section, supported about a central axis, with the rotatable elements forming a ring on the race. In such case, each element would be spaced from its neighbours by a spacing member, so that the spacing members together would form a concentric ring. A surface, in the form of a circular race, concave in cross-section, and concentric with and similar to the processing race, also engages the elements.

A centrally disposed rotatably mounted shaft is provided which may be attached to the second race or the spacing members, for driving the elements over the processing surface.

The processing surface is preferably held stationary and disposed radially outwardly of the rotatable elements and the spacing members and second race. This arrangement ensures that material to be processed will in operation be thrown radially outwardly onto the processing surface from the radially inward race and spacing members, and the outward radial precipitation of the material will be aided by the translating and rotating elements which will urge the material toward the processing race. The rate of working would be regulated by adjusting the feed rate of material and the speed of rotation of the central shaft driving the spacing members or second race.

The surface of the processing race is generally inclined to the plane of the race which plane is normal to central axis, and the second race is generally oppositely inclined to face the processing race the element lying there between.

This inclination relative to the central axis tends to promote a twisting movement of the elements as they translate, so that in the case where the elements are spherical, a point on the surface of the translating sphere tends to execute a gyratory movement describing circles on the surface of the sphere. This twisting tendency serves advantageously to insure that all the working surfaces of the elements contact the processing race so that wear on the working surfaces of elements and race alike is even, and the working life of these is thus improved.

The spacing members are so arranged as to facilitate this gyratory movement substantially without producing friction or otherwise increasing the resistance to movement of the elements. The power consumption of the apparatus is consequently low.

Where the elements and the spacing members are spherical the gyratory motion of each of the elements is passed to the adjacent spacing member, which in turn will then gyrate in a manner to match the gyratory movement of the other element with which it makes contact.

The arrangement of processing elements alternating with spacing members leads to the rotations of the elements all being in the same sense.

The processing of material by the apparatus generates large amounts of heat. This is particularly so where the process is one of dry grinding of solid materials to fine powders.

Heat may be dissipated from the processing surface by spraying a cooling fluid, such as water against the outer face of a generally ring-shaped component on which the processing surface is formed.

Heat may also be dissipated by passing a cooling fluid which may be a liquid or a gas such as air through the apparatus. This gas could flow generally in either direction through the apparatus but preferably would pass in the general direction followed by the material through the apparatus. The gas can serve to entrain the product for transportation out of the apparatus.

The action of the apparatus on solid material is generally to roll, crush, knead, cut and shear the material between the gyrating surface of the elements and the processing surface. A mixture of particle sizes results, and the greater proportion of these particles will be sufficiently small for use. The particles are then removed from the apparatus, for example by entraining with air, and then classified for size by an air-separator. The finer particles are retained in a suitable collector whilst the coarser particles are transported back to the apparatus for further processing.

An important factor in the design of the apparatus according to the invention is the degree of concavity of the processing surface and second race in relation to the convexity of the working surfaces of the elements. These parameters must be carefully selected to achieve maximum power transmission from the drive means to the processing surface and the best possible grinding efficiency.

The radius of curvature of a section through the concave processing race will for best results be greater than the corresponding dimension for the rotatable elements. For driving the elements via the second race in contact with the elements, the radius of curvature in section of the concave second race would be selected in accordance with the corresponding dimensions for the elements and processing surface. For example, the referred-to radius for the second race would be 2% to 3% greater than the radius for a spherical element, and that for the processing surface 3% to 4% greater than that of the element.

Such relative dimensions of element and processing surface must be selected for the optimal power consumption and for securing an even distribution of particle size range according to the material to be processed. The stated relative dimensions of the element and second, surface are exemplary of those suitable for securing maximum power transmission to the elements and processing surface for a specific duty. It will be appreciated that the amount of power transmission is dependent on the contact area between the elements and the second race, and the greater is this area, the greater the power which can be transmitted, though of course the friction generated over the area is increased. For producing very fine particles in the sub-micron or milli-micron order of size, it is important that the materials for the elements, spacing members and surfaces must be suitably selected. Hard castings or even high-quality steel are better replaced by harder materials such as chilled cast-iron or steel, metallic carbides or ceramics. The processing elements and the processing surfaces need not be formed from the same materials. The smaller the elasticity factor of the elements, and the greater the radius of curvature of the concavity of the processing surface in relation to the radius of the elements, the wider is the band on the processing surface over which the processing can take place and in the case of grinding solid materials the greater is the degree of fineness and the quantity of the fine particles which can be produced.

In order that the invention may be better understood, a number of exemplary embodiments will now be described with reference to the accompanying drawing in which.

Figure 11A:
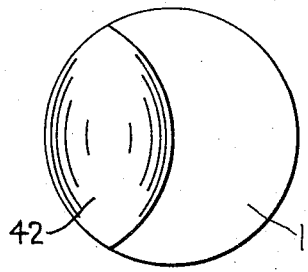
Figure 11B:
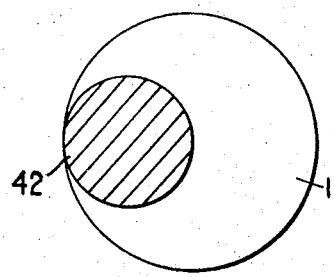

FIGURES 11a and 11b diagrammatically illustrate the relative dimensions of two exemplary types of processing element.

Figure 12:
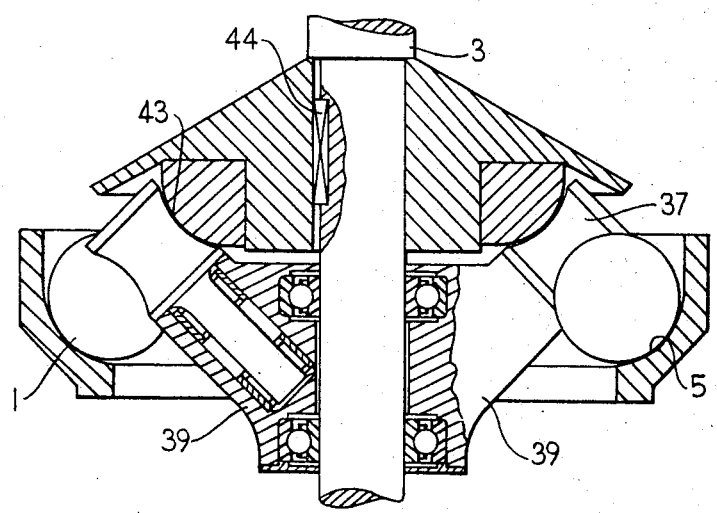

FIGURE 12 is a longitudinal section showing part of a seventh embodiment and

Figure 13:
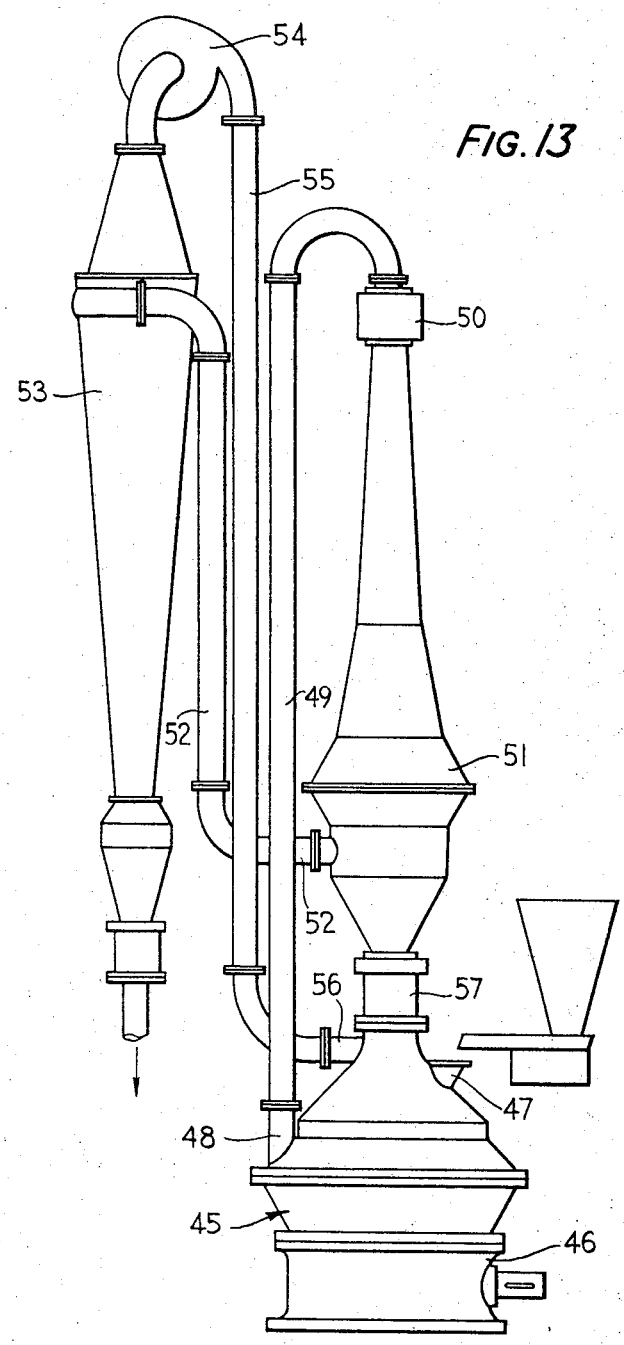

FIGURE 13 shows an arrangement for grinding solids.

Figure 1:
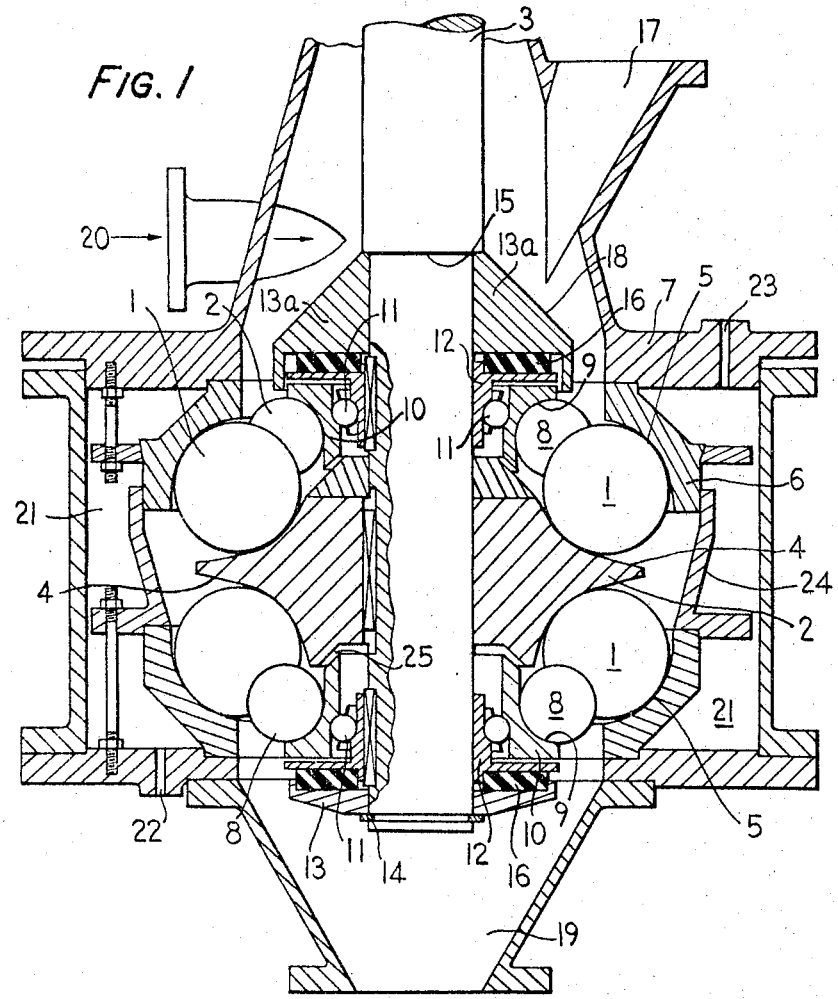
FIGURE 1 is a longitudinal section through a first embodiment.

Referring to FIGURE 1, there will be seen two rings of rotatable spherical elements 1, the rings being separated by a disc 2 which is keyed for axial but non-rotational movement to a rotatable shaft 3.

The spheres 1 are in contact on one side with a concave race 4 on disc 2 and on the other side with a concave processing race 5 formed on a rotationally fixed part 6. The races 4 and 5 are so disposed as to be spaced generally along a line which intersects the axis. The inclination of this line would usually fall in the range of 15°–88° relative to the axis depending on the duty, although for general duties, 45° has been found to be useful.

Pressure can be applied to material between spheres 1 by exerting the necessary force on top plate 7, which acts through fixed part 6 and the upper processing race 5, to urge the race toward the upper ring of spheres 1. These spheres 1 press downwards on disc 2 through the upper face 4 thereof. The disc 2 can axially slide on shaft 3 to convey the pressure to the lower ring of spheres 1 which are thus caused to be urged into pressure contact with the lower processing race 5. Any solid material disposed between the spheres 1 and the processing races 5 is thus subject to the force exerted on top plate 7.

Each of the spheres 1 is separated from its neighbours on either side in the ring by spherical spacing members 8, which are maintained against the spheres 1 by a further race or supporting surface 9 formed in a bushing 10. The bushing 10 is supported on shaft 3 through ball bearings 11, which are received in a member 12 which is keyed to the shaft 3 to permit axial sliding of the bushing 10 and member 12 while allowing bushing 10 to rotate independently.

A lower block 13 is provided, which is fixed against axial movement on the shaft by circlip 14, and which serves to support the lower ring of spacing spheres 4 through the member 12 and bushing 10. An upper block 13a is disposed between a step 15 on the shaft 3 and the upper member 12. Between blocks 13, 13a and the associated members 12 are provided elastic pads or springs 16 so as to exert pressure on the spacing spheres 8 whilst permitting movement of the latter in response to changes in the load on them.

It will be seen that the pressure applying system for urging the spheres 1 and the processing races 5 together for processing material therebetween is quite separate from the pressure-applying system for maintaining the spacing spheres 8 in position.

None of the spheres 1 can contact its neighbours due to the presence of the spacing spheres 8, so that a major source of wear and power loss is eliminated. The processing spheres 1 are therefore substantially free to execute true rolling movement over the processing surface.

Figure 2:
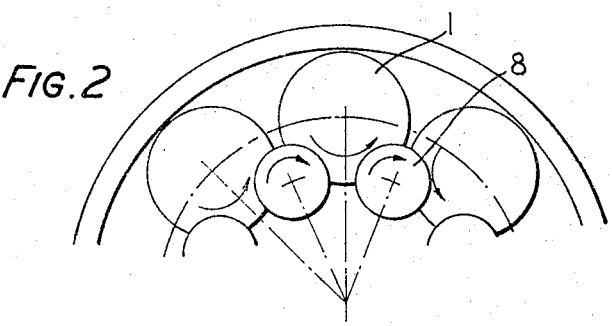
FIGURE 2 is a schematic plan view showing the relative dispositions and directions of rotation of the spherical elements and spacing members shown in FIGURE 1.

As will be seen from FIGURE 2, the presence of the spacing spheres 8 in no way hinders this rolling movement. The spheres 8 merely roll over the contacting spheres 1 without skidding, while the bearing-mounted bushing 10 can move differentially with respect to shaft 3 in accordance with the rolling speed of the spheres 8 on their races 9.

The use of the apparatus will now be described for the dry grinding of a coarsely powdered solid, although it is to be understood that any of the referred-to processes may be carried out if required.

The processing of material is performed by feeding in the material at entrance 17, and then falls under the action of gravity onto the outer surface 18 of block 13a. The centrifugal force caused by rotation of block 13a, together with the paddling action of processing spheres 1 and spacing spheres 8, throws the material onto the upper processing race 5 where it is rolled, crushed, kneaded, cut and sheared by the inter-action of the convex-surfaces of spheres 1 against the concave processing surfaces 5 under pressure. The rate of rotation of shaft 3 must be so adjusted that there is little or no chance of material passing straight through the apparatus without coming between a sphere 1 and the processing surface 5.

Material falls from the upper processing surface 5 to the lower processing surface 5, the uniform distribution thereof being aided by the rotating disc 2 and the inward-turn guide ring 24. At the lower processing surface 5, the material is once again rolled, crushed, kneaded and sheared by the twisting spheres 1 and crushed, and eventually falls to the exit funnel 19.

To facilitate the internal cooling of the apparatus and the distribution of the material, air or other cooling gas is introduced tangentially at duct 20. The air vortex this produced is arranged to rotate in the same direction as all the grinding parts of the apparatus, and prevents the free fall of the unground particles while enhancing the uniform distribution of the material to the processing races 5. The air also serves to remove the sufficiently fine particles from the processing surfaces 5 this securing free uncushioned crushing surfaces for fresh material. This cooling air may be used to regulate the internal temperature of the apparatus.

Further temperature regulation is attained by introducing cooling water around the fixed parts 6 bearing the processing surfaces 5 for dissipating the heat therein. The cooling water is introduced into an annular chamber 21 through inlet 22, and the water leaves via outlet 23.

The entry of the material into the region of ball-bearings 11 is prevented by the outward-turning configuration of gaps 25 between the disc 2 and the bushing 10.

Figure 3:
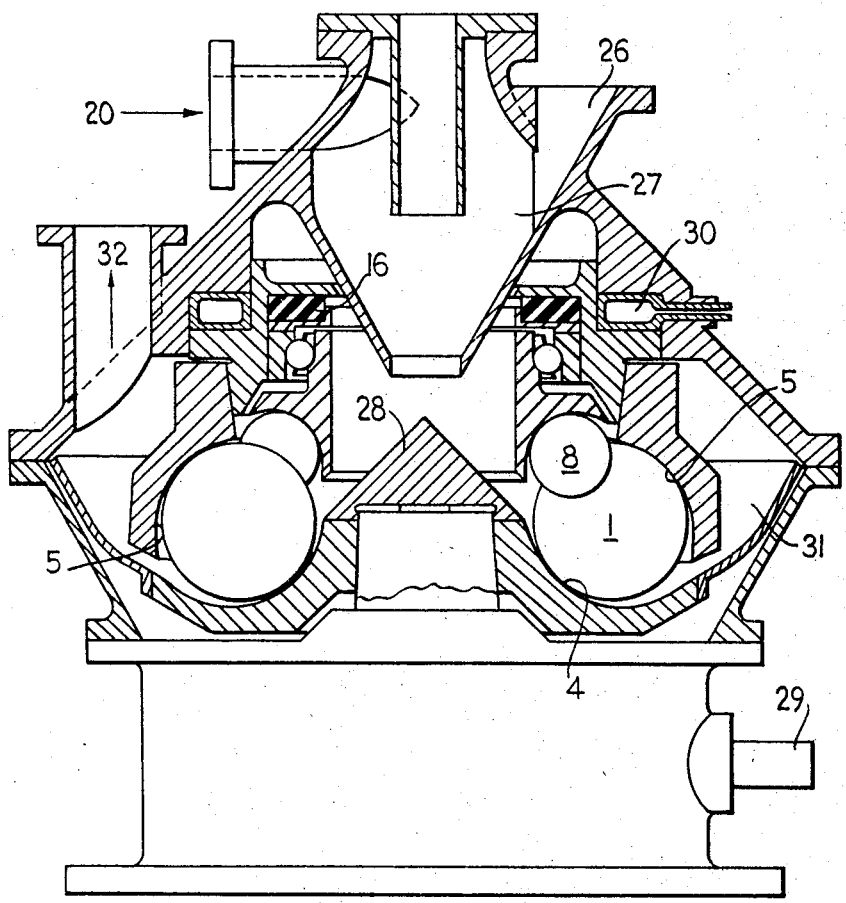
FIGURE 3 is a longitudinal section through a second embodiment.

FIGURE 3 illustrates a second embodiment which is more useful for the dry grinding of bulk material substances such as coal:

The material to be processed is fed in at entrance 26 and falls through vortex chamber 27 onto rotating distribution cone 28 wherefrom it is outwardly flung onto processing race 5 where it is over-run, rolled and crushed by processing spheres 1. The spheres are rolled over the processing surface 5 by the rotation of the rotating driving race 4 attached with cone 28 to a driving shaft 29 through gears.

Pressure can be exerted on the processing race 5 through a hydraulically operated member 30.

The processing spheres 1 are spaced as in the embodiment of FIGURE 1 spacing spheres 8 in rolling contact therewith under the pressure of pads or springs 16. Air is introduced tangentially through duct 20 into vortex chamber 27, and sweeps the material through the apparatus while also serving to dissipate heat. The air and entrained finely ground materials leave via gap 31 and escape through duct 32.

Figure 4:
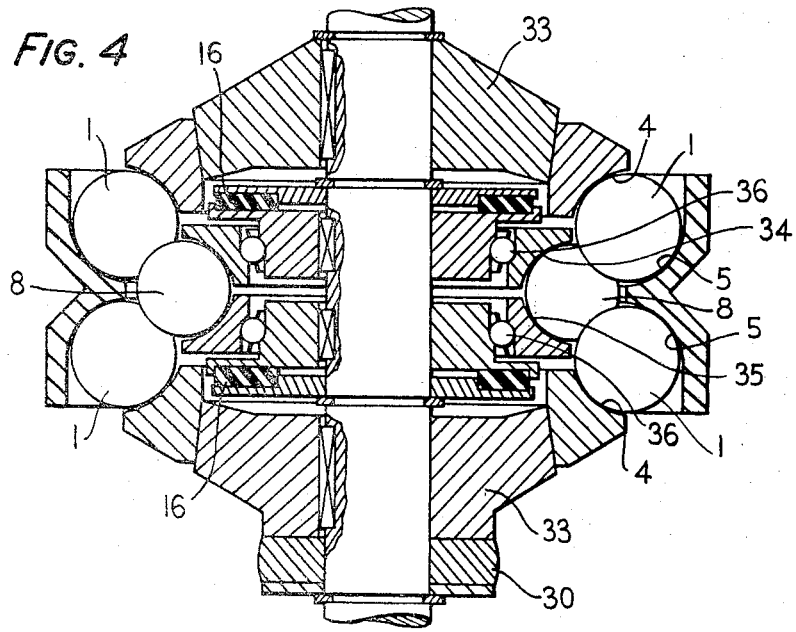
FIGURE 4 is a longitudinal section through a third embodiment of the invention.

FIGURE 4 illustrates a third embodiment in which two parallel rings of processing spheres 1 are provided while a single ring of spacing spheres 8 maintains the processing spheres 1 in both rings in their correctly spaced arrangement. In this embodiment, the processing spheres 1 are driven by the axially outer races 4 which are formed on supporting members 33 keyed to the shaft for axial movement.

Figure 6:
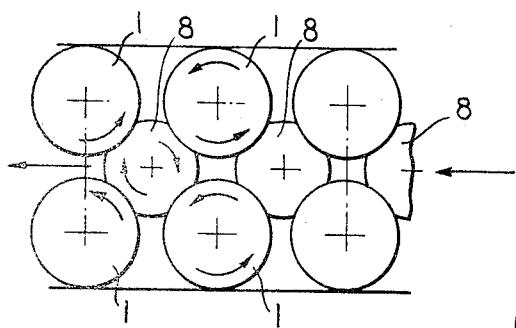
FIGURE 6 is a schematic side view of the elements and members shown in FIGURES 4 and 5.

The spacing spheres 8 can roll in two races 34 and 35 which are separately supported on bearings 36 so that the spheres 8 can roll differentially between the races 34, 35. FIGURE 6 illustrates the directions of rolling of spheres 1 and spheres 8 in relation to each other.

Pressure between the processing spheres 1 and processing races 5 is generated by springs, or hydraulic pressure devices 30. The contact pressure between the spacing spheres 8 and the races 34, 35 is maintained by elastic pads, springs or the like, 16.

Figure 5:
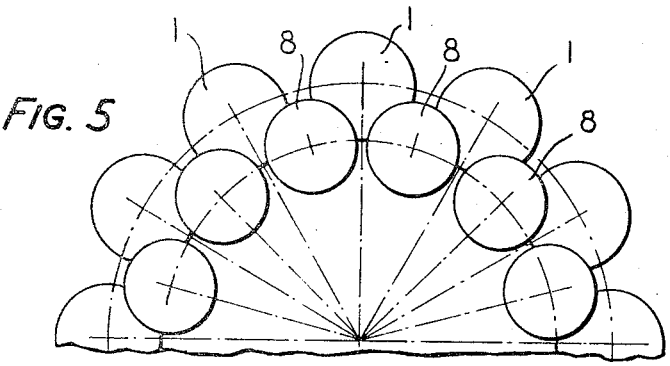
FIGURE 5 is a schematic plan view of elements and members in the embodiment of FIGURE 4.

FIGURE 5 illustrates the spatial relationship between the middle row of spacing spheres 8 and the lower row of processing spheres 1.

Figure 7:
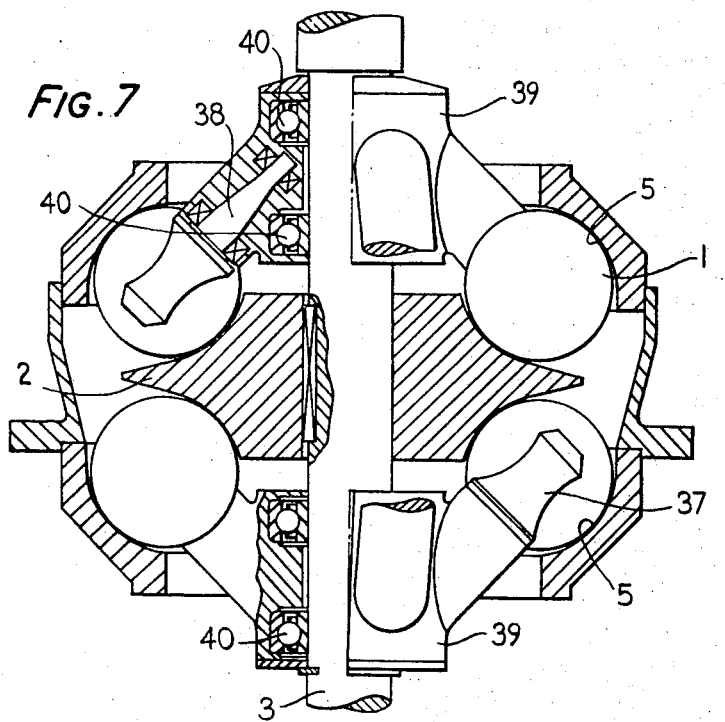
FIGURE 7 is a longitudinal section through a fourth embodiment.

In FIGURE 7, the spacing spheres 8 or the previous embodiments have been replaced by rollers 37 which rotate on axles 38 which are integral with upper and lower spindles 39. Each of the spindles is mounted through bearings 40 to shaft 3 to permit differential movement of the spindles 39 with respect to the shaft 3.

It will be seen that the shape of the rollers 37 is complementary to that of the processing spheres 1. The processing pressure between spheres 1 and the processing races 5 is obtained in exactly the same manner as in the embodiment illustrated in FIGURE 1, the processing races 5 in effect being slidable towards each other, while central disc 2, being slidably keyed on shaft 3 can axially accommodate for such movement of the races 5.

The separate pressure on the spacing rollers 37 may be derived in any suitable manner such as those previously mentioned.

Figure 8:
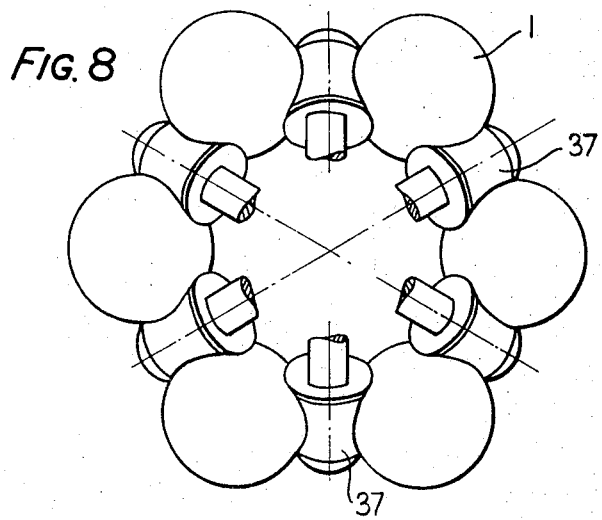
FIGURE 8 is a schematic plan view of part of the embodiment of FIGURE 7.

FIGURE 8 shown in plan view the relative disposition of the processing spheres 1 and the spacing rollers 37.

Figure 9:
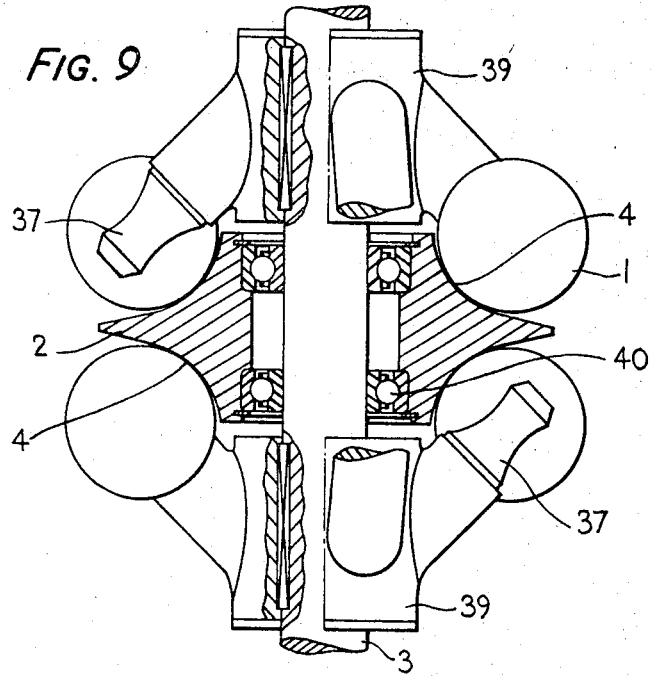
FIGURE 9 is a longitudinal section showing part of a fifth embodiment of the invention.

In FIGURE 9, a variant of the main parts of the previous embodiment is illustrated. The disc 2 is now supported on the central shaft 3 through bearings 40 instead of being keyed thereto, whilst the spindles are keyed to the shaft for axial movement instead of being supported through bearings.

In this arrangement, the driving of the processing spheres 1 is accomplished by the spacing rollers 37 on the spindles 39 non-rotatably keyed to shaft 3. The differential movement of disc 2 resulting from the spheres 1 rolling in races 4 may take place due to its mounting on shaft 3 through bearings 40. This variant is advantageously suitable for producing coarser end products than those from the embodiment of FIGURE 7 because the proecssing spheres 1 are directly driven by the spacing rollers 37, and the spheres 1 can therefore be of lesser accuracy of shape without sacrificing the efficiency of driving contact between themselves and the rollers 37. In consequence, coarser products can be obtained efficiently and the feed material can be coarser than in the previously described embodiments.

Figure 10:
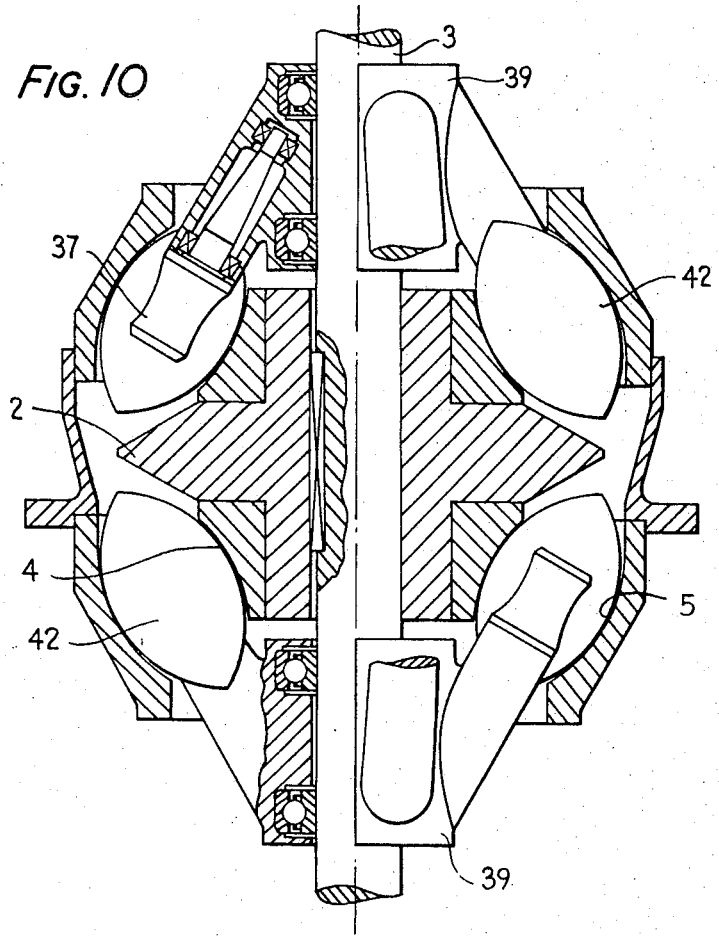
FIGURE 10 is a longitudinal section through a sixth embodiment of the invention.

FIGURE 10 illustrates an embodiment in which the processing spheres 1 are replaced by substantially ovoid shaped rollers 42, which can roll between races 4 and 5 in the same manner as the spheres 1. Spacing rollers 37 separate the rollers 42, and these may be mounted on bearing-supported spindles 39 as illustrated, or on spindles keyed to shaft 3, the mounting for disc 2 being varied as appropriate for the necessary differential rotation.

There is no reason, of course, why the ovoid rollers 42 cannot be separated from each other by spacing spheres as described in connection with, say, FIGURE 1. The arrangement in FIGURE 10 is most suited for grinding soft materials in bulk, such as for example, talc, where the advantages of large diameter processing spheres for grinding can be equally obtained by smaller, lighter and more economic ovoid rollers 42.

FIGURE 11a shows a sphere 1 having the same curvature as the processing surfaces as an ovoid 42. FIGURE 11b is a cross-section of the sphere and ovoids of FIGURE 11a. It will be appreciated from these two diagrams that the mass of the ovoid 42 is considerably less than that of a sphere of equivalent processing ability.

In FIGURE 12 is illustrated a further embodiment in which processing spheres 1 are driven over processing race 5 by space-keeping rollers 37, which latter can roll over the rotatable convex race 43 of complementary shape to the rollers 37. The race 43 is supported on shaft 3 by keying means 44 permitting axial sliding. In a variant, the mounting spindle 39 for the rollers may be driven whilst convex race 43 is held stationary.

FIGURE 13 illustrates an arrangement for grinding solid materials to fine powder incorporating processing apparatus according to the invention, indicated generally by 45. Any of the described embodiments may be used, but FIGURE 13 illustrates by way of example the apparatus of FIGURE 3.

The apparatus 45 is driven through gear-box 46. Material for processing is fed in at inlet 47, and the product is carried away for example by air through outlet 48, through duct 49 and adjustable vortex head 50 to particle size separator 51. The separated fines can be removed from separator 51 through ducting 52 and collected in dust-collector 53. The cleaned carrying air is extracted by fan 54 and recycled via duct 55 to the air inlet 56 of the apparatus 45.

Coarse particles leave separator 51 at the lower part via valve system 57 to be reprocessed by the apparatus 45.

Due to the regular use of the whole rolling surfaces of the processing elements, the grinding, mixing and homogenising capacity of the present apparatus according to the invention is high and uniform. The dimensions of such a unit are much smaller than those of known apparatus. The mechanical and economic efficiency of the present apparatus is several times greater than for previously-known apparatus. Furthermore, in grinding of solids, the proportion of fines is high, and to grind the whole bulk of the fed material to under 10 microns is easily possible; particles can be produced in bulk in the sub-micron range to well under 1 micron.

As previously stated, the absolute eveness and low rate of wear lead to the maintaining of the correct shape of the grinding elements. The present apparatus is very flexible as regards the range of materials which can be processed, the only important considerations for control of the product being the speed of the processing elements which would be dependent on shaft speed, and the feed rate of the materials.

Whilst a number of embodiments have been described in which the processing elements are substantially of sperical or part-spherical shape, it is to be understood that other configurations for these are possible. For example, cylindrical rollers may be used, which may coact with a convex processing surface, or alternatively concave or convex rollers co-operating with a convex or concave processing surface respectively. It is further contemplated that flat processing surfaces may be utilized. It is also envisaged that while the invention has been described in relation to embodiments in which only one of the surfaces inter-acting with the processing elements can be rotationally driven, for certain purposes, more than one of such surfaces may be driven.

It is to be understood that while a maximum of two processing surfaces in series has been described, more than two processing surfaces may be used in series.

What we claim is:

1. Apparatus for processing material, said apparatus comprising in combination: an annular processing surface; a plurality of processing elements arranged to execute a true rolling movement over said surface; a rotatable spacing member disposed between and in engagement with each pair of adjacent elements to space them apart; a first annular bearing surface bearing on the elements; means for urging said annular surface into a direction pressing the elements against the processing surface; a second annular bearing surface bearing on said spacing members; and driving means for causing the elements to roll on the processing surface, during such rolling the spacing members executing a substantially true rolling movement over the elements and said second bearing surface with which they engage.

2. Apparatus according to claim 1 wherein said processing surface and said first bearing surface are concentric about an axis and one of said surfaces is rotationally drivable, the other being stationary, and said drivable surface is in fixed relationship with a rotatable shaft.

3. Apparatus according to claim 2 in which the processing surface and the first bearing surface are arranged so that they can be urged together along a line which intersects said axis.

4. Apparatus according to claim 1 in which the processing surface has a concave face toward the elements, and each one of the elements has a convex surface in engagement therewith, the radius of curvature of the concavity exceeding the radius of curvature of the surface of the element in contact therewith.

5. Apparatus according to claim 1 in which the first bearing surface has a concave face towards the elements.

6. Apparatus according to claim 5 in which the radius of curvature of the concavity of the processing surface exceeds the radius of curvature of the convexity of the elements by about 3% to 4%.

7. Apparatus according to claim 1 in which the elements are of substantially spherical shape.

8. Apparatus according to claim 1 in which the elements are of substantially ovoid shape.

9. Apparatus according to claim 1 in which the spacing members are of substantially spherical shape.

10. Apparatus according to claim 1 in which said second bearing surface has a concave face concentric with said processing surface.

11. Apparatus according to claim 1 in which said second bearing surface is supported through bearings on a rotatable shaft.

12. Apparatus according to claim 1 in which said second bearing surface is supported through bearings on a part which is normally stationary.

13. Apparatus according to claim 1 in which each member comprises a roller having rolling surfaces in contact with the elements, said rolling surfaces being of substantially complementary shape to the shape of the contacted parts of the elements.

14. Apparatus according to claim 13 in which the rollers are each supported through bearings for rolling rotation about respective axes.

15. Apparatus according to claim 14 in which the rollers are mounted on a unit which is supported by a rotatable shaft.

16. Apparatus according to claim 15 in which the shaft is a driving shaft.

17. Apparatus according to claim 1 in which the first and the second bearing surfaces are formed as a unitary surface arranged to be in rolling contact with the spacing members for driving and pressing the processing elements against the processing surface.

18. Apparatus for processing materials comprising an annular concave processing surface and an annular second surface coaxial therewith, between which lie a plurality of spherical processing elements each of which will roll over said surface and is of a radius less than that of the concavity the surfaces, a rotatable spacing member between each element of a pair of adjacent elements so that the elements are spaced apart by the members which bear thereagainst, the centers of the elements and members lying of a cone, the apex of which lies on the axis of the annular surfaces, means being provided to urge the second surface and the processing surfaces toward each other to cause the elements to press against the processing surface, there being also provided a driving means which can cause the elements to move relative to, and to roll on, the processing surface, during such movement, the elements contra-rotating relative to the spacing members with which they engage, and a self-centering supporting surface for locating the members.

19. Apparatus according to claim 18 in which one of the second surface or the supporting surface is driven by said driving means, and the other one of said surfaces is mounted on bearings.

20. Apparatus according to claim 1 comprising a plurality of processing surfaces in series.

References Cited

UNITED STATES PATENTS

| | | | |
|---|---|---|---|
| 565,176 | 8/1896 | McGlew | 241—103 X |
| 1,380,112 | 5/1921 | Middelboe | 241—103 X |
| 1,833,560 | 11/1931 | Carr | 241—103 |
| 1,912,762 | 6/1933 | Crites | 241—105 |
| 2,177,026 | 10/1939 | Nightenhelser | 172—297 |

HARRISON L. HINSON, *Primary Examiner.*

H. F. PEPPER, *Assistant Examiner.*